United States Patent
Brownell et al.

(10) Patent No.: US 10,451,172 B2
(45) Date of Patent: Oct. 22, 2019

(54) TRANSMISSION COOLING ARRANGEMENT WITH OVERHEAD SPRAY

(71) Applicant: Deere & Company, Moline, IL (US)

(72) Inventors: Douglas K. Brownell, Bartlesville, OK (US); Kyle K. McKinzie, Altamont, KS (US)

(73) Assignee: DEERE & COMPANY, Moline, IL (US)

( * ) Notice: Subject to any disclaimer, the term of this patent is extended or adjusted under 35 U.S.C. 154(b) by 313 days.

(21) Appl. No.: 14/997,923

(22) Filed: Jan. 18, 2016

(65) Prior Publication Data
US 2017/0204962 A1 Jul. 20, 2017

(51) Int. Cl.
*F16H 57/04* (2010.01)
*B60K 11/02* (2006.01)

(52) U.S. Cl.
CPC ....... *F16H 57/046* (2013.01); *F16H 57/0412* (2013.01); *F16H 57/0424* (2013.01); *F16H 57/0473* (2013.01); *F16H 57/0484* (2013.01); *B60K 11/02* (2013.01); *B60Y 2200/415* (2013.01)

(58) Field of Classification Search
CPC ............. F16H 57/0412; F16H 57/0424; F16H 57/0447; F16H 57/046; F16H 57/04; B60Y 2200/415; B01D 35/14; F16D 13/72; F16D 13/52; F16D 13/58; F02N 15/025
USPC ........................................................ 210/168
See application file for complete search history.

(56) References Cited

U.S. PATENT DOCUMENTS

| 3,157,257 | A | * | 11/1964 | Root | F16D 67/04 188/152 |
| 4,429,587 | A |   | 2/1984 | Finn, III et al. | |
| 4,446,953 | A | * | 5/1984 | Voss | F16D 13/72 192/112 |
| 4,459,208 | A | * | 7/1984 | Lemon | B01D 29/35 184/6.12 |
| 6,206,163 | B1 | * | 3/2001 | Schneider | F16D 25/0638 192/113.3 |

(Continued)

FOREIGN PATENT DOCUMENTS

DE 102016200009 B3 * 12/2017 ............... B60T 5/00
EP 1215418 A1 * 6/2002

(Continued)

OTHER PUBLICATIONS

EPO Machine Translation of FR2744508 (A1), Alain, Aug. 8, 1997 (Year: 1997).*

(Continued)

*Primary Examiner* — Vinh Luong
(74) *Attorney, Agent, or Firm* — Klintworth & Rozenblat IP LLP

(57) ABSTRACT

A cooling assembly for a transmission component includes a housing having one or more walls at least in part defining an internal cavity in which the transmission component is mounted. A coolant passage extends through the one or more walls of the housing. A spray plate is mounted to the housing. The spray plate has one or more openings extending through the spray plate in communication with the coolant passage and configured to disperse coolant from the coolant passage to effect an altered spray pattern exiting from a flow outlet of the coolant passage.

15 Claims, 5 Drawing Sheets

(56) References Cited

U.S. PATENT DOCUMENTS

| | | | | |
|---|---|---|---|---|
| 6,227,333 | B1* | 5/2001 | Scheib | F16H 57/0434 |
| | | | | 184/6.12 |
| 8,475,319 | B2* | 7/2013 | Forssberg | F16D 13/74 |
| | | | | 475/230 |
| 2009/0173579 | A1* | 7/2009 | Vu | F16H 57/0402 |
| | | | | 184/6.12 |
| 2009/0308707 | A1* | 12/2009 | Illerhaus | F16D 13/644 |
| | | | | 192/70.12 |
| 2013/0140017 | A1* | 6/2013 | Kim | F28F 27/02 |
| | | | | 165/299 |
| 2015/0101679 | A1* | 4/2015 | Forrest | B05B 9/0413 |
| | | | | 137/237 |
| 2015/0316331 | A1* | 11/2015 | Kim | F28F 3/044 |
| | | | | 165/81 |
| 2016/0215664 | A1* | 7/2016 | Boyer | F01M 5/005 |
| 2017/0211715 | A1* | 7/2017 | Balmaceda | F16H 57/0412 |
| 2018/0031051 | A1* | 2/2018 | McKinzie | F16D 13/72 |

FOREIGN PATENT DOCUMENTS

| | | | |
|---|---|---|---|
| FR | 2744508 | * | 8/1997 |
| JP | 2007170498 A | | 7/2007 |
| KR | 1020080038735 A | | 5/2008 |

OTHER PUBLICATIONS

EPO Machine Translation of JP2007170498 (A), Uesugi et al., May 7, 2007 (Year: 2007).*
Derwent Abstract of DE 102016200009 B3, Harb, Dec. 1, 2017 (Year: 2017).*
German Patent and Trade Mark Office, Search Report in German Patent Application No. 10 2016 225 910.5 dated Jul. 10, 2017.

* cited by examiner

US 10,451,172 B2

TRANSMISSION COOLING ARRANGEMENT WITH OVERHEAD SPRAY

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to a cooling arrangement for facilitating dispersed cooling fluid flow to one or more heat-generating components within a housing, such as frictional components of a transmission assembly.

BACKGROUND OF THE DISCLOSURE

Transmission assemblies of various kinds for various work vehicles may include gears and associated components arranged to contact a fluid to dissipate heat and ease engagement of mating parts. Cooling is particularly important for certain heat-generating components (e.g., brakes, clutch packs and the like). Certain transmission components may be configured or located (e.g., nested within other components) such that it may be difficult to adequately deliver the cooling fluid thereto. The tight packaging of one or more gear sets within the transmission may also inhibit cooling fluid from being routed to certain components.

SUMMARY OF THE DISCLOSURE

This disclosure provides a cooling arrangement, such as may be used in a planetary gear set of a transmission assembly, to facilitate a spray of cooling fluid flow to one or more components of the transmission.

In one aspect the disclosure provides a cooling assembly for a transmission component having a housing and a spray plate. The housing has one or more walls at least in part defining an internal cavity in which the transmission component is mounted. The housing has a coolant passage extending through the one or more walls. The spray plate is mounted to the housing and has one or more openings extending through the spray plate. The one or more openings in the spray plate are in communication with the coolant passage and are configured to disperse coolant from the coolant passage to effect an altered spray pattern exiting from a flow outlet of the coolant passage.

In another aspect the disclosure provides a cooling assembly for a transmission component. The housing has one or more walls at least in part defining an internal cavity in which the transmission component is mounted. The housing defines a coolant passage having a flow outlet extending within the one or more walls from a coolant port of the housing. A plug is mounted to the housing to close the coolant port. A spray plate is mounted to the housing and, at least in part, is retained by the plug within the coolant passage. The spray plate has one or more openings extending through the spray plate and configured to disperse coolant from the coolant passage to effect an altered spray pattern exiting from the flow outlet of the coolant passage.

In still another aspect the disclosure provides a transmission assembly. The transmission arrangement includes a housing having one or more walls at least in part defining an internal cavity. The housing defines a coolant passage having a flow outlet extending within the one or more walls from a coolant port of the housing. In the housing cavity is at least one disk pack having a set of friction disks and a set of disk plates interleaved with the set of friction disks. The housing fixedly mounts one of the set of friction disks and the set of disk plates. A spray plate is mounted to the housing. The spray plate has one or more openings extending through the spray plate and is configured to disperse coolant from the coolant passage to effect an altered spray pattern exiting from the flow outlet of the coolant passage onto the at least one disk pack.

The details of one or more implementations or embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
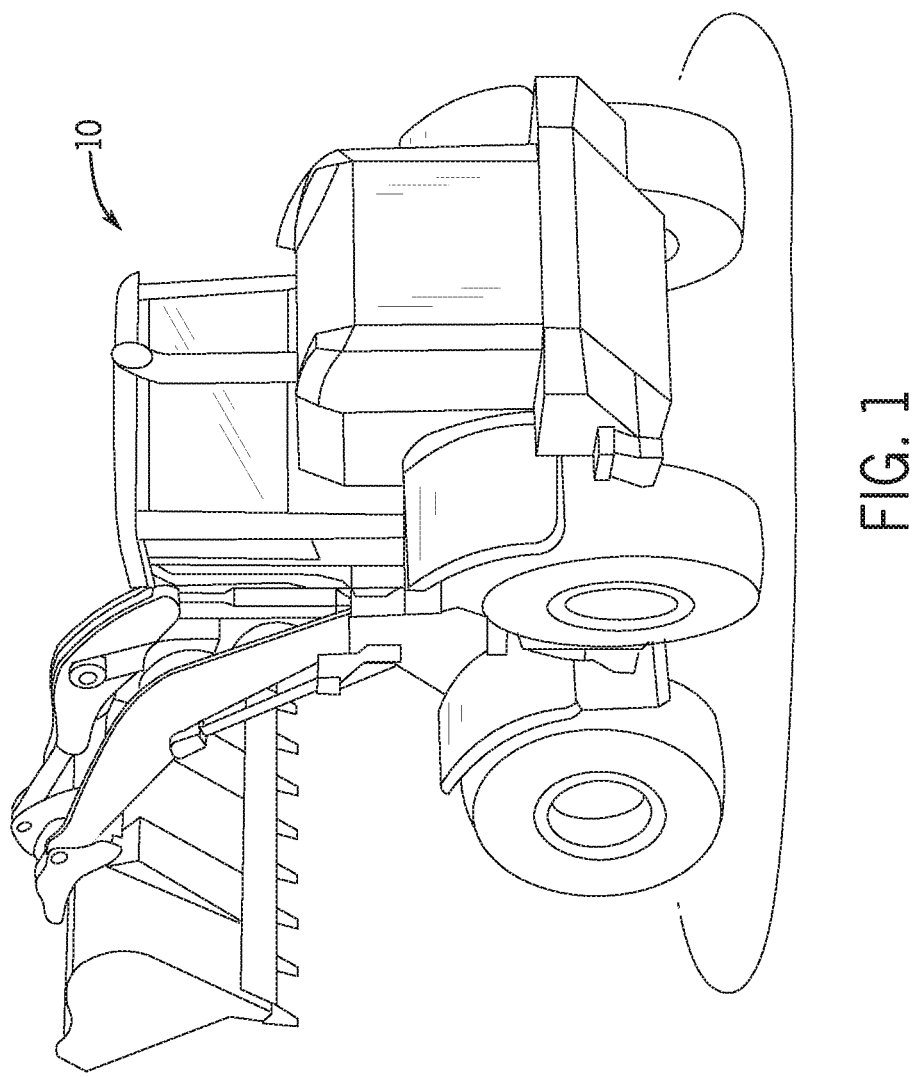
FIG. 1 is an isometric view of an example work vehicle having an example transmission arrangement as illustrated in accordance with an example embodiment of this disclosure.

The following describes one or more example embodiments of the disclosed cooling arrangement, as shown in the accompanying figures of the drawings described briefly above. Various modifications to the example embodiments may be contemplated by one of skill in the art.

As used herein, the term "axial" refers to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction.

Additionally, the term "annular" (and derivatives) are used herein to refer to the radial sides or surfaces of an annulus, for example, the outward and inward facing sides or surfaces of an annular body. In the case of an annular body that is symmetric about a central reference axis or centerline, these annular sides and surfaces may correspond with circumferential sides or surfaces thereof, which may also be considered the inner and outer diameter sides or surfaces.

The following describes a cooling arrangement that is well-suited for use within a transmission arrangement, for example, containing a planetary gear train, such as a planetary transmission in the drivetrain of a work vehicle. The cooling arrangement includes one or more coolant flow passages, which are strategically routed through the transmission housing to provide coolant to heat-generating components of the transmission. The cooling arrangement may have the coolant flow passages arranged so that flow outlets are arranged vertically above, or overhead of, the heat-generating components that are targeted to be cooled, for example, annular friction packs of a planetary set, and provide a shower, mist or spray of coolant that falls down upon these components, which may otherwise be difficult to supply with coolant flow. In so doing, the cooling arrangement may improve the thermal performance of the planetary transmission, while promoting the thorough distribution of lubricating coolant to minimize wear and prolong the operational lifespan of the transmission components.

The cooling arrangement may be configured to provide improved dispersion of the coolant to better penetrate the interior spaces of the transmission and cover the heat-generating components. In certain embodiments, the cooling arrangement includes one or more spray plates located at the coolant flow passages to alter the outlet flow thereof. In some cases, the spray plates are separate, discrete features from the transmission housing and are mounted to the housing over or within the coolant flow passages. The spray plates, however, may be integrally formed with the transmission housing. The spray plates have one or more through openings to separate and disperse the coolant into separate flow streams. The dispersed flow streams effectively widen the spray pattern of the coolant in the manner of a showerhead.

In certain embodiments, the spray plates may be perforated disks. The perforated disks may be mounted to the housing within the coolant flow passages using various mechanical connecting features. For example, the perforated disks may be mounted, in part, by a plug that connects directly to the housing (e.g., by mating threads). The plug may directly engage the associated perforated disc, or may indirectly engage the perforated disk via an intermediate element, such as a sleeve, spring or other component that facilitates flow of coolant therethrough. In certain embodiments, a single through bore may serve to define a part of the coolant flow passage that contains a perforated disc, an intermediate component and a plug. One or more leading passages of the coolant flow passage may feed coolant to the through bore by intersecting with the through bore within the housing wall(s). The leading passages may direct coolant through the spaces between the spring, or through openings in a sleeve or other intermediate feature, before reaching the perforated disc.

Referring now to the drawings, an example embodiment of the disclosure will be described in detail. FIG. 1 shows an example wheeled loader 10 containing a planetary transmission in which embodiments of the cooling arrangement are usefully included. A wheeled loader 10 is provided by way of contextual example only. It will be appreciated that embodiments of the cooling arrangement described herein are not restricted to usage in any particular planetary gear set, planetary transmission, or type of vehicle or platform, including other work vehicles used in the agriculture, construction and forestry industries. Embodiments of the cooling arrangement may be beneficially utilized within the planetary transmission of a work vehicle, such as the wheeled loader 10, as such transmissions may require relatively robust cooling and lubrication systems. Further, the planetary transmissions of work vehicles commonly contain certain components (e.g., clutch and brake packs) that are positioned around or otherwise located proximate a planetary gear set, that are prone to the generation of excess heat during operation of the transmission, and that have traditionally been challenging to supply with active coolant flow during operation of the planetary transmission.

Figure 2:
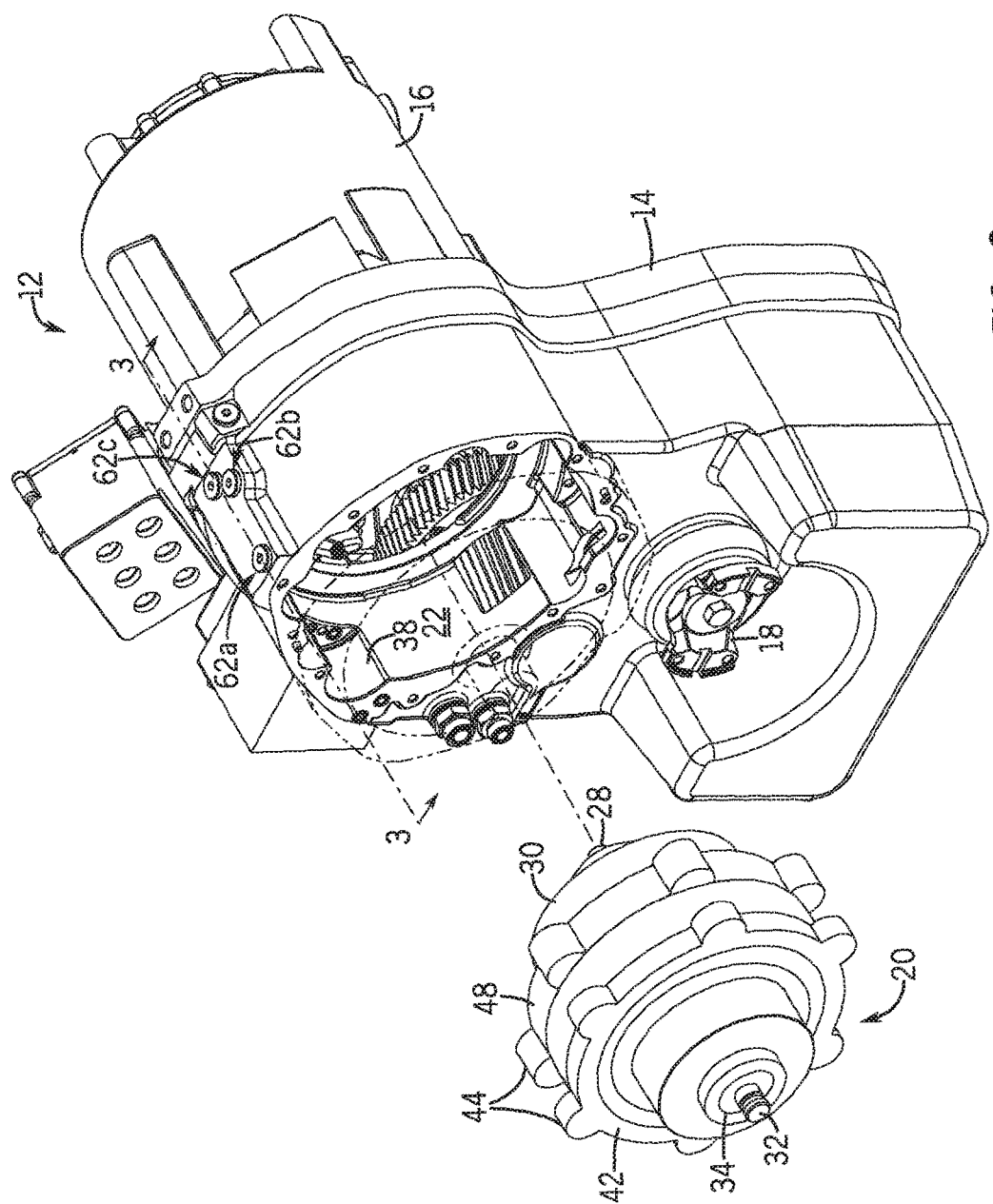
FIG. 2 is an isometric view of the example transmission in the work vehicle of FIG. 1.
Figure 3:
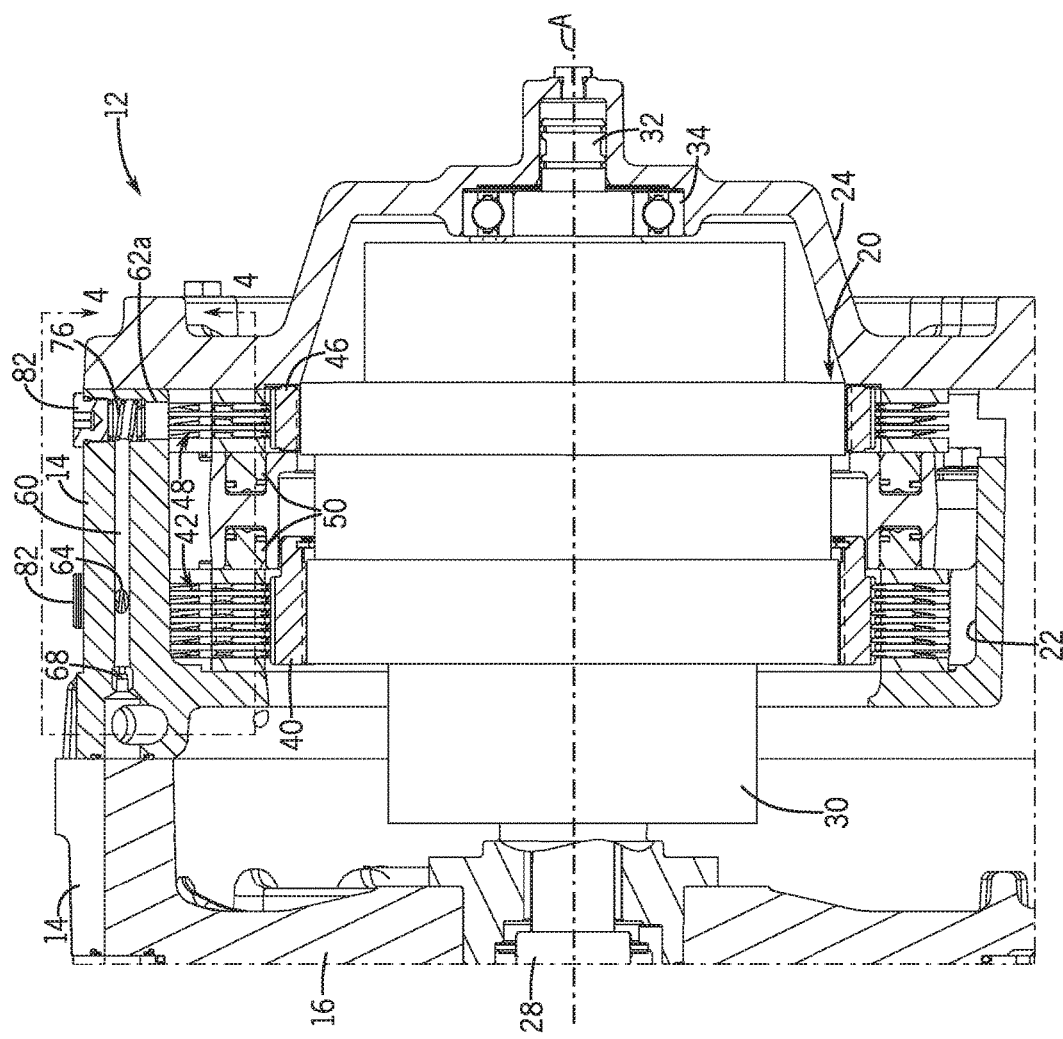
FIG. 3 is a cross-sectional view of the example transmission as taken along line 3-3 of FIG. 2, showing an example cooling arrangement.

FIGS. 2 and 3 show an example planetary transmission 12 that may be included in the wheeled loader 10. In this particular example, the planetary transmission 12 may be a 3-speed power shift transmission; however, the particular type, construction, and functionality of the planetary transmission 12 is largely incidental and will only be described briefly herein. Generally, the planetary transmission 12 includes a housing 14, a drive motor 16 supported by the housing 14, and a first output shaft 18. Although not shown in FIGS. 2 and 3, the planetary transmission 12 may also include a second output shaft, which may be the same the output shaft 18, but which extends from the opposite side of the housing 14. A gear train may be contained within the planetary transmission 12 that mechanically links the drive motor 16 to the output shafts 18. As may be seen in FIG. 3, the gear train may include a planetary gear module or "planetary gear set 20." The planetary gear set 20 is matingly received within a compartment or chamber 22, and enclosed by a cover 24 attached to the housing 14, for example, by a plurality of bolts or other such fasteners. The planetary gear set 20 may include an input gear 28 and an output gear 30, which may be spur and helical gears, respectively. The input gear 28 engages the drive shaft of the drive motor 16, while the output gear 30 engages additional gearing within the planetary transmission 12 linking the planetary gear set 20 to the output shafts 18. The input gear 28 of the planetary gear set 20 is fixedly joined to a central shaft 32, which extends longitudinally through the planetary gear set 20. As may be seen in FIG. 3, a rolling element (e.g., ball) bearing 34 may be disposed around the opposing terminal end of the shaft 32 and received within an annulus provided in the cover 24. The shaft 32 may be fixedly connected to a sun gear (not shown) that engages a number of planet gears (not shown) that are supported by a planet carrier (not shown) and that engage a ring gear 40 that circumscribes the planet carrier and splines to a first disk pack 42, which may serve as a first range brake pack for the transmission.

The planetary gear set 20 may include numerous other components that may vary amongst embodiments and that will not be described in detail herein. It is noted briefly, however, that such components may include an additional carrier and supported planetary gears, an additional ring 46, one or more additional multi-lobed disk packs (one of which is identified in FIGS. 3-5 by reference numeral "48" and another of which is within the interior of the planetary gear set 20), various housing elements, fasteners, and rolling element (e.g., ball and/or roller) bearings. Additionally, further embodiments of the planetary gear set 20 and, more generally, the planetary transmission 12 may include various other coolant distribution features, such as shaft-driven pumps, plumbing, and the like.

The ring gear 40 may spline to a first disk pack 42, which may serve as a first range (e.g., low range) brake pack for the transmission, and the second disk pack 48 may serve as a second range (e.g., mid or high range) brake pack for the transmission. The construction of the disk packs 42, 48 may vary amongst embodiments. However, by way of example, the disk packs 42, 48 may each include relatively thick backer plates, relatively thin separator plates positioned between the backer plates, friction disks interleaved with the separator plates, and springs (not shown) biasing the separator plates and friction disks toward a non-contacting position. The ring gear 40 may have a splined outer circumferential surface that engages the friction disks of the disk pack 42 in a rotationally fixed relationship such that the ring gear 40 and the friction disks of the disk pack 42 co-rotate when the planetary gear set 20 is driven. A similar arrangement may be provided for the ring gear 46 and disk pack 48, for example. For both disk packs 42, 48, the backer and separator plates may be joined in a stacked configuration by a number of fasteners and include radial projections or lobes 44, which engage corresponding recesses 38 provided in the chamber 22. During operation of the planetary transmission 12, hydraulically-actuated annular pistons 50 may selectively exert an axially-compressive force across the disk packs 42, 48 to slow or stop the rotation of the friction disks and, therefore, the rotation of the ring gears 40, 46.

The disk packs 42, 48 may generate a considerable amount of heat when utilized to slow or stop the rotation of elements of the planetary gear set 20. Even when one or more of the disk packs 42, 48 are disengaged, excess heat may be generated by friction between the separator plates and the rapidly rotating friction disks of the disk pack 42, 48. It is thus desirable to dissipate such excess heat by contacting the disk packs 42, 48 with an active flow of liquid coolant, such as a suitable oil. However, due to the relatively tight packaging of the transmission components, it may be difficult or impractical to deliver sufficient coolant flow to the interior of the disk pack 42, 48 or other internal components.

For this reason, a cooling arrangement is provided with one or more coolant flow passages and certain other features, which promote the flow and dispersion of oil or another coolant to a desired discharge area, such as the outer annular or circumferential surfaces of the disk packs 42, 48. By virtue of this design, the cooling arrangement may continuously deliver a dispersed coolant flow into the interior of the disk packs 42, 48 for improved heat dissipation. Additionally, in embodiments wherein the coolant is oil or another liquid having lubricating properties, the coolant may further lubricate the disk packs 42, 48 to reduce heat-generating friction, to minimize wear of the component of friction disk pack 42, 48 and to prolong the serviceable lifespan thereof.

Figure 4:
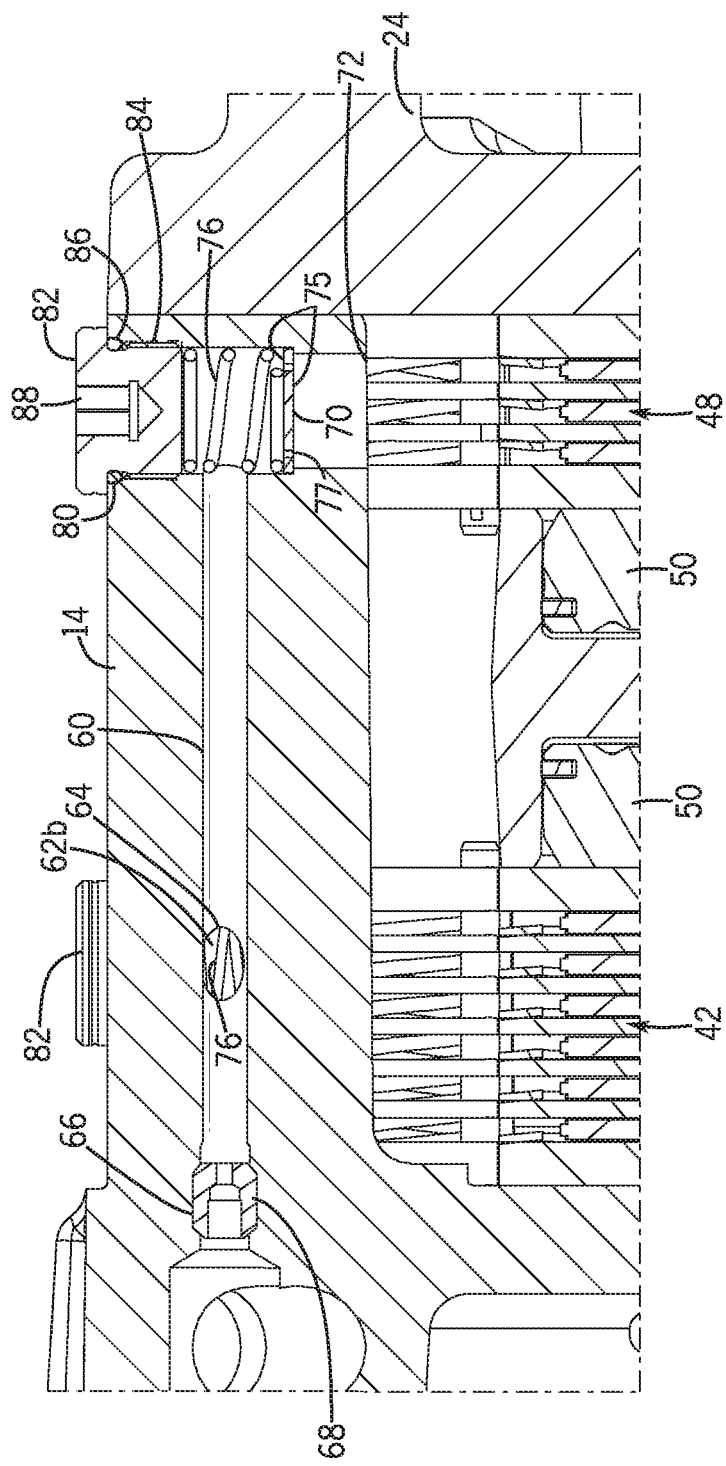
FIG. 4 is an enlarged cross-sectional detail view of the area 4-4 of FIG. 3.
Figure 5:
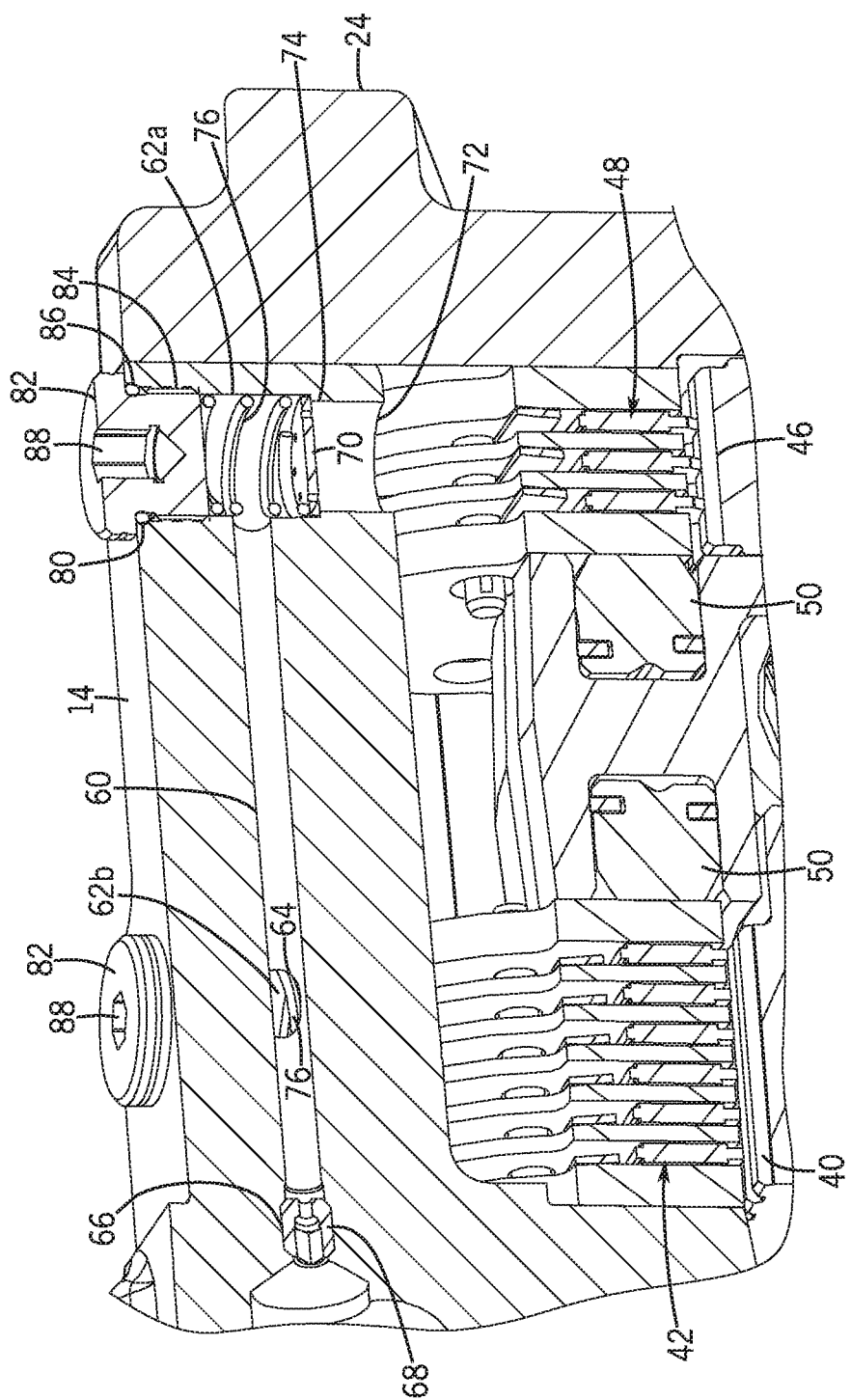
FIG. 5 is an isometric view thereof.

An example cooling arrangement will now be described in detail in the context of the example planetary transmission 12 illustrated. Referring also to FIGS. 4 and 5, the housing 14 may be configured with coolant passages, including one or more axial passageways 60 generally parallel to a reference axis "A" (e.g., the axis of rotation of the input gear 28) of the planetary gear set 20, and one or more radial passageways, which intersect the axial passageway(s) 60. In the illustrated example, there is a single axial passageway 60 and three radial passageways 62a, 62b, 62c (indicated generally in FIG. 2) arranged to intersect the axial passageway 60 in order to provide fluid communication therebetween. In this case, the axial passageway 60 is configured to terminate at radial passageway 62a with center axes of the axial 60 and radial 62a passageways intersecting. The radial passageways 62b, 62c are configured to intersect the axial passageway 60 at different locations along its length. Center axes of the radial passageways 62b, 62c do not intersect the center axis of the axial passageway 60, but rather are spaced apart on transverse "sides" of the axial passageway axis. As a result, the openings 64 (one shown in FIGS. 4 and 5) between the circular cross-sectioned axial 60 and radial 62b, 62c passageways are oblong.

In addition, in the illustrated example, the cooling passages are located in a portion of the housing 14 such that, when mounted in the wheeled loader 10, the planetary transmission 12 is maintained in a vertical orientation (as shown in FIG. 2) in which the cooling passages are vertically above the planetary gear set 20, and thus above the heat-generating components targeted for cooling. Still further, in the illustrated example, the radial passageways 62a-62c may generally be oriented along axes that are normal to the horizon, again when the planetary transmission 12 is mounted to the wheeled loader 10 and when the wheeled loader 10 is on generally flat, even terrain. Thus, the cooling arrangement provides overhead spray of the coolant onto the transmission components targeted for cooling (e.g., friction disk packs and the like).

Other configurations for routing the coolant are possible, including, for example, using a dedicated axial passageway for each radial passageway and using one or more passageways that are obliquely oriented with respect to the reference axis A of the planetary gear set 20. Moreover, the coolant is shown and described as being routed through internal passageways in one or more walls making up the housing 14 of the planetary transmission 12. However, other means of routing the coolant could be used, including passageways at the interior or exterior of the housing 14, either formed internal to other interior or exterior walls, or in separate conduit members (e.g., rigid or flexible hoses, tubes, pipes or the like) arranged to communicate coolant within or into the housing 14 as needed to impinge upon components of the planetary gear set 20 mounted within the housing 14.

The axial passageway 60 communicates coolant from other upstream areas within the housing 14, such as in or near the drive motor 16, and delivers the coolant to each radial passageway 62a-62c. In the illustrated example, the sectional flow area upstream of the axial passageway is greater than the sectional flow area of the axial passageway 60. The sectional flow area of each of the radial passageways 62a-62c is also greater than that of the axial passageway 60. The flow of coolant reaching the targeted components of the planetary gear set 20 may be selectively controlled by appropriate sizing of the flow areas of the coolant passage (e.g., axial passageway 60 and/or radial passageways 62a-62c). Alternatively or additionally, an interchangeable component may be used for flow control. For example, in the illustrated example, at the leading or upstream end of the axial passageway 60 is a transition area 66 which necks down to the axial passageway 60 but has a larger diameter in which a flow orifice insert 68 may be mounted (e.g., by threaded engagement, press-fit or other mechanical means). A flow orifice insert 68 of one orifice dimension may be removed and replaced with a different flow orifice insert of a different orifice dimension, as needed for a desired coolant flow volume and/or flow rate. In certain applications, the flow characteristics of the coolant passage without the flow orifice insert 68 installed may be desired, such that the flow orifice insert 68 may be removed and not replaced.

At the downstream side of the coolant passage is one or more spray plates that effect a change in the exiting coolant flow prior to impinging upon the components of the planetary gear set 20 to be cooled. In the illustrated example, a discrete spray plate is provided at each outlet of the coolant passage. More specifically, the example construction has spray plates, in the form of disks, mounted at or near the outlet of each the radial passageway 62*a*-62*c*. In particular, each spray disk 70 is mounted inside the associated radial passageway 62*a*-62*c* inset from an outlet opening 72. The spray disks 70 may be mounted in various manners, including by permanent or semi-permanent attachment techniques (e.g., welding, press-fit, shrink-fit, adhesives or other bonding or welding processes). Removable mounting techniques may also be used, such as mating threads and the like. In the illustrated example, the spray disks 70 are each mounted onto a circular shoulder 74 and are held in place by a retainer 76. No additional mechanical connection is made.

The retainers 76 may be any suitable component that can apply a counterforce acting on the spray disks 70 in the direction toward the shoulders 74 as well as allow flow to pass from the axial passageway 60 through the radial passageways 62*a*-62*c* to the outlet openings 72. In the illustrated example, the retainers 76 are springs. The springs provide biasing force acting on the spray disks 70 by compression of the springs. The springs are selected so that in use they are not in a fully compressed, or fixed length, state, that is, so that spacing exists between the coils of the spring. In this way, coolant may flow through the spacing of the spring from the axial passageway 60 to the outlet openings 72 of the radial passageways 62*a*-62*c*. As noted, other components may be used for the retainers 76. For example, rather than a spring, a fixed length member, such as a spacer, may be used. The spacer may be a sleeve, for example, providing a hollow core with one or more openings in the wall so the sleeve allow flow to pass between the axial 60 and radial passageways 62*a*-62*c*. Solid core spacer elements may also be used provided they including the necessary porting.

The end of each retainer 76 opposite the associated spray disk 70 may contact, and press against in the case of a spring retainer, a wall of the housing 14 or other wall which forms a closed end of each radial passageway 62*a*-62*c* opposite the respective outlet opening 72. Alternatively, the radial passageways 62*a*-62*c* may be open-ended, each forming an access port 80 opposite the outlet opening 72. Each access port 80 may be closed by a plug 82. The plugs 82 may be permanently mounted once assembly of the retainers 76 and spray disks 70 are installed. However, removably mounting the plugs 82, for example via a threaded connection 84, allows the retainers 76 and spray disks 70 to be accessed after initial installation. This allows the retainers 76 and the spray disks to be inspected, maintained or replaced as needed. More aptly, removable plugs 82 allow the spray disks 70 to be interchanged with spray disks having different perforation patterns, as discussed further below. The access ports 80 may be useful for visual inspection or physical access to the coolant or to adjacent components of the planetary gear set 20 (or other elements of the planetary transmission 12). To reduce or prevent leakage, O-rings 86 (or other seals, gaskets or sealing compounds) may be placed around the plugs 82 underneath the enlarged heads of the plugs 82 to seal against the access ports 80. Each plug head may further have a tool receptor 88 (e.g., a hex opening) at its center or at its outer periphery that may be engaged by a tool (e.g., driver, wrench, etc.) to apply sufficient torque to the plugs 82.

The spray disks 70 themselves may be identical or near identical, for example, in terms of material, diameter, thickness and perforation pattern, or they may differ in one or more respects. The spray disks 70 are substantially the same in the illustrated example. By way of non-limiting example, the spray disks 70 may be a blank metal disk of a common sheet metal gauge, such as 16-gauge steel sheet metal (approximately 1.5 mm thick). The planar spray disks 70 have opposite flat sides 75 and one or more through openings 77 therein, which may be formed in any known technique. For example, the spray disks 70 may be laser cut and define a uniform pattern of spaced apart perforations of any suitable size, for example approximately 1-2 mm in diameter. The spray disks 70 alter the outflow of coolant from the coolant passage, specifically, from the outlet openings 72 of the radial passageways 62*a*-62*c*. In the illustrated example, the uniform perforation pattern provides a plurality of narrowed flow streams that are separated and dispersed to effectively widen the spray of the coolant exiting each of the radial passageways 62*a*-62*c*, providing a shower of coolant that may increase the penetration and coverage area reached by the coolant. Separating and dispersing the spray pattern also increases the surface area of the coolant, which may enhance the cooling heat transfer. The resulting effect of the spray disks 70 is thus to increase the area or elements of the planetary gear set 20 contacted by the coolant, and thus the cooling capacity of the coolant.

The non-permannent, removable mounting of the spray disks 70 allows them to be replaced with spray disks providing a different, common spray pattern in all three radial passageways 62*a*-62*c*. Alternatively, a mixture of spray disks may be used to provide varied spray patterns across the passageways 62*a*-62*c*. The spray pattern utilized may vary and be selected to optimize the coverage and penetration of the coolant for a given area or component targeted for cooling. For example, if coolant penetration is critical (e.g., to cool deep into densely packed components), then a spray disk that provides a narrow, focused spray pattern may be desired, whereas if breadth of coverage is important (e.g., to cool the exposed surface of a large component or assembly), then a spray disk that provides a widely dispersed or diffused spray pattern may be desired. Various spray patterns providing a combination of penetration and coverage to a greater or lesser extent may be used. Moreover, not only may the pattern (i.e., count, size, spacing, arrangement, etc.) of like perforations (e.g., spaced apart circular openings) differ to change the spray pattern, but perforations of different configurations may be used. For example, the spray disks may have one or more relatively long and narrow slits may be to effect one or more thing ribbons of coolant. The spray disks may have also have perforations of geometric, spiral and other configurations. The quantity and spatial arrangement of the spray disks and radial passageways may also vary depending on the application.

During operation of the planetary transmission 12, the cooling arrangement will provide pressurized coolant flow to targeting heat-generating components of the planetary gear set 20, including both the of the friction disk packs 42, 48. The location and orientation of the coolant passages, specifically the radial passageways 62*a*-62*c* being vertical above the friction disk packs 42, 48 and being oriented so that the outlet openings 72 opening in a downwardly orientation, allows coolant to be distributed (e.g., showered) onto the friction disk packs 42, 48 aided by gravity. This, and the separated and dispersed spray pattern, allows the coolant to cover and penetrate in between the individual disks of the disk packs 42, 48. The coolant contacting the disk packs 42, 48 conductively removes excess heat from the disk packs 42, 48 to provide the desired heat dissipation and improve the overall thermal performance of the planetary transmission 12. The coolant arrangement may further discharge coolant directly or indirectly onto other components of the planetary gear set 20, such as at the interfaces between the ring gears 40, 46 and the disk packs 42, 48. This, in turn, may further minimize frictional heating and reduce component wear in embodiments in which oil or another lubricating liquid is used as the coolant.

There have thus been described embodiments of a cooling arrangement, which is advantageously utilized within a planetary gear set or a larger planetary transmission suitable for usage within a work vehicle. The cooling arrangement includes coolant flow passages, which may be configured (e.g., located and sized) to intake coolant and direct active coolant flow to nearby components of a transmission (e.g., surrounding friction packs) for purposes of enhanced heat dissipation and/or lubrication. The coolant flow passages have spray elements that effect an altered spray pattern to disperse the coolant and provide improved penetration and coverage of coolant to internal heat-generating components of the transmission, such as friction packs of the planetary gear set. The enhanced cooling improves the operation life of these components and the overall operability of the transmission. Embodiments of the cooling arrangement allow for the spray elements to be readily accessed for cleaning, replacement or interchanging with sprays providing different spray patterns.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A transmission cooling assembly comprising:
    a transmission component;
    a housing containing the transmission component defining a coolant passage leading from an outlet opening that opens within the housing to an access port at an exterior of the housing, the transmission component being in radial alignment with the coolant passage between the outlet opening and the access port;
    a plug mounted to the housing to close off the access port;
    a spray plate having opposite flat faces extending across and disposed within the coolant passage, the spray plate having a plurality of openings in communication with the coolant passage and the outlet opening; and
    a retainer extending within the coolant passage between the plug and the spray plate and engaging the spray plate to seat within the coolant passage against a portion of the housing;
    wherein the spray plate disperses coolant through the outlet opening of the coolant passage onto the transmission component.

2. The cooling assembly of claim 1, wherein the plurality of openings defines a flow area that is at least as large as the outlet opening of the coolant passage.

3. The cooling assembly of claim 2, wherein the spray plate is a disk and the coolant passage has a circular cross-section.

4. The cooling assembly of claim 3, wherein the portion of the housing is an annular shoulder that supports the spray plate within the coolant passage.

5. The cooling assembly of claim 4, wherein the retainer engages the spray plate to seat against the shoulder.

6. The cooling assembly of claim 5, wherein the retainer is a spring.

7. The cooling assembly of claim 1, wherein the spray plate is separate from the housing.

8. The cooling assembly of claim 1, wherein the spray plate is separate from the housing and is mounted to the housing within the coolant passage.

9. A transmission assembly, comprising:
    a disk pack;
    a housing containing the disk pack and defining a coolant passage leading from an outlet opening that opens to the disk pack to an access port at an exterior of the housing, the disk pack being in radial alignment with the coolant passage between the outlet opening and the access port;
    a plug mounted to the housing to close off the access port;
    a spray plate having opposite flat faces extending across and disposed within the coolant passage, the spray plate having a plurality of openings in communication with the coolant passage and the outlet opening; and
    a retainer extending within the coolant passage between the plug and the spray plate and engaging the spray plate to seat within the coolant passage against a portion of the housing;
    wherein the spray plate disperses coolant through the outlet opening of the coolant passage onto the disk pack.

10. The transmission assembly of claim 9, wherein the plurality of openings defines a flow area that is at least as large as the outlet opening of the coolant passage.

11. The transmission assembly of claim 9, wherein the spray plate is separate from the housing.

12. The transmission assembly of claim 11, wherein the spray plate is a disk and the coolant passage has a circular cross-section.

13. The transmission assembly of claim 12, wherein the portion of the housing is an annular shoulder that supports the spray plate within the coolant passage.

14. The transmission assembly of claim 13, wherein the retainer engages the spray plate to seat against the shoulder.

15. The transmission assembly of claim 14, wherein the retainer is a spring.

* * * * *